Aug. 4, 1942.   H. O. WULFF   2,291,781
CURRENT COLLECTOR
Filed May 20, 1941
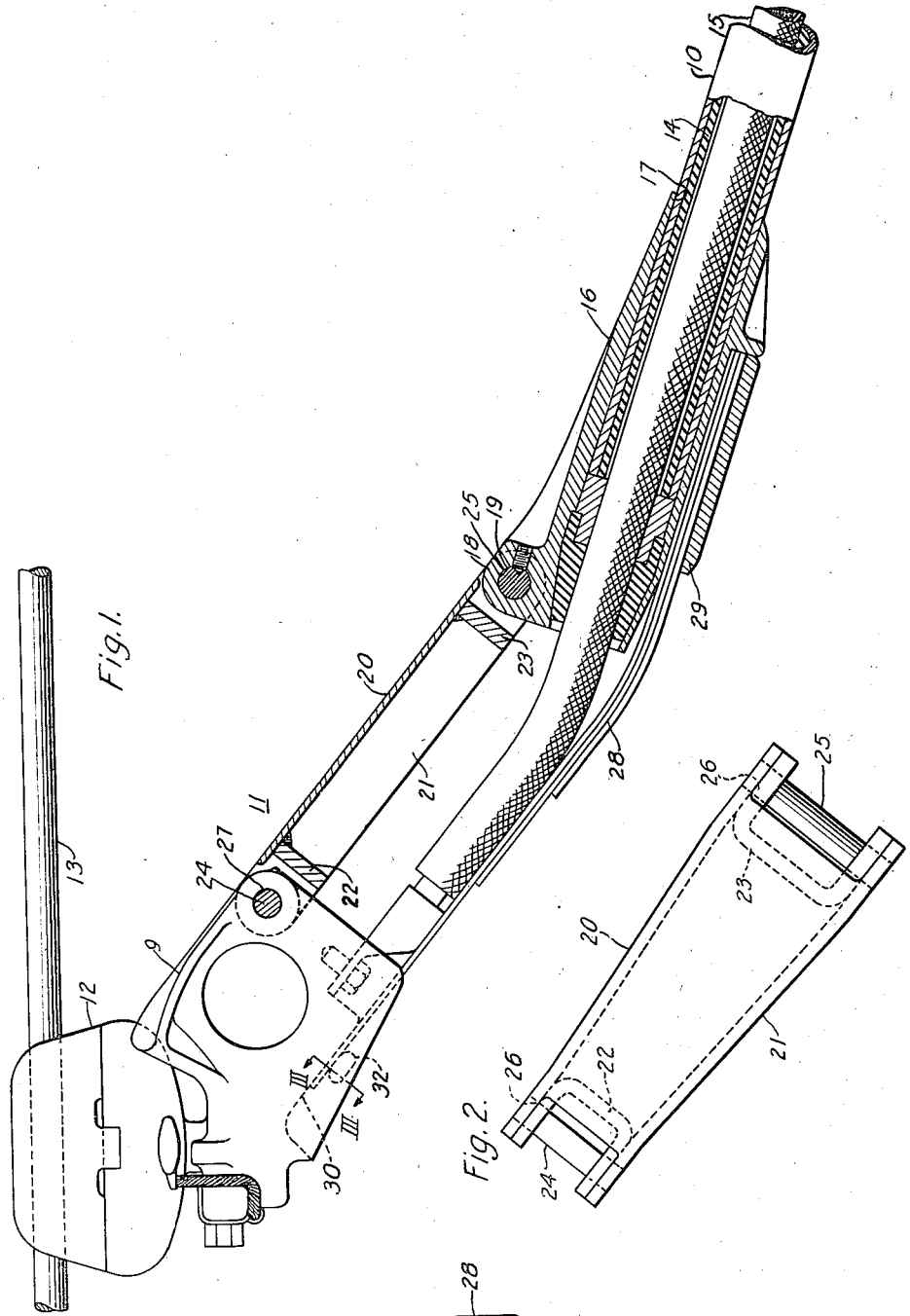
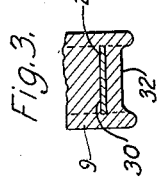
WITNESSES:
INVENTOR
Herbert O. Wulff
BY
ATTORNEY Patented Aug. 4, 1942

2,291,781

UNITED STATES PATENT OFFICE 2,291,781

CURRENT COLLECTOR

Herbert O. Wulff, Potsdam, near Berlin, Germany, assignor to Westinghouse Electric & Manufacturing Company, East Pittsburgh, Pa., a corporation of Pennsylvania Application May 20, 1941, Serial No. 394,273
In Germany December 12, 1939

4 Claims. (Cl. 191—60.3)

My invention relates, generally, to current collectors for electrically propelled vehicles, and it has reference in particular to a current collector head for use with a slider shoe or trolley wheel.

Generally stated, it is an object of my invention to provide a current collector head which shall be simple and inexpensive to manufacture and strong and durable in operation.

More specifically, it is an object of my invention to provide for pivotally connecting the carrier element of a current collector head on which the slider shoe or trolley wheel is mounted to a trolley pole support member and utilizing a resilient member for urging the carrier element into a predetermined normal operating position relative to the support member.

Another object of my invention is to provide for utilizing a spring support member between the carrier element and support member of a current collector and having frictional engagement with one of said parts to provide a resilient damped support for the carrier element on which the slider shoe or trolley wheel is mounted.

A further object of my invention is to provide for pivotally supporting the carrier element of a current collector head on a trolley pole for movement in a vertical plane with respect to the trolley so that the slider shoe or trolley wheel carried thereby may move about an axis transverse to the longitudinal axis of the trolley pole in a horizontal plane and utilizing a damped resilient auxiliary support for limiting movement of the carrier element relative to the trolley pole.

Yet another object of the invention is to utilize a pivotal connector for securing the carrier element of a current collector head to a support and limit the movement of the carrier element relative thereto by means of a resilient damped auxiliary support interposed therebetween.

Other objects will in part be obvious, and will in part appear hereinafter.

In accordance with the invention, the carrier element of current collector head on which the slider shoe or trolley wheel is mounted may be connected to a support member on a trolley pole by means of a connector or clip pivotally attached to the support member and the carrier element so as to provide relative movement of the slider shoe or trolley wheel about a plurality of axes transverse to the longitudinal axis of the trolley pole and in a horizontal plane. A leaf or bar spring may be connected between the support member and the carrier element on the lower side thereof, being rigidly connected either to the support member or the carrier element. This arrangement has the advantage that the connector or clip may have a relatively high mechanical strength so that damage thereto is excluded if the current collector is de-wired and strikes a cross wire supporting the trolley wire. At the same time, the carrier element of current collector head is yieldingly mounted with respect to the trolley pole and is capable of yielding considerably under normal operating conditions so as to follow closely the trolley conductor, and also minimize the shock of striking the cross-wire and prevent damage to the trolley pole or parts of the head should the slider shoe be de-wired.

For a more complete understanding of the nature and scope of my invention, reference may be had to the following detailed description which may be taken in connection with the accompanying drawing in which:

Figure 1 is a side elevational view partly in section of a current collector embodying the principal features of my invention:

Fig. 2 is a plan view of one form of connector or clip; and

Fig. 3 is a sectional view taken along the line III—III of Fig. 1.

Referring to Fig. 1, the reference numeral 10 may denote, generally, a trolley pole of any suitable type for supporting a current collector head 11 in which a slider shoe 12 may be pivotally mounted for universal movement to engage a trolley wire 13.

The trolley pole 10 may be provided, if desired, with a suitable insulating liner 14 therein, to protect the current collecting conductor 15 which may be connected to the collector head 11 in any suitable manner and positioned within the trolley pole 10 for conducting current to the motors and control devices of the vehicle (not shown).

In order to support the current collector head 11 on the trolley pole 10 and provide for relative movement between the trolley pole and the carrier element 9 of the head whereon the slider shoe 12 is pivotally supported, a suitable support member 16 may be provided having a socket portion 17 therein for receiving the end portion of the trolley pole 10, and an upwardly projecting ear portion 18 on the upper side having a transverse opening 19 therein. Suitable means, such as the elongated connector or clip 20, may be provided for pivotally connecting the carrier element 9 to the support member 16 and maintaining it in spaced relation relative thereto. The connector or clip 20 may, for example, as shown in Figs. 1 and 2, comprise a channel-shaped body member having depending side portions 21 which project therefrom at the ends. Substantially U-shaped reenforcing members 22 and 23 may be secured in any suitable manner, such as by welding, to the body member adjacent the ends to reenforce the projecting end portions and provide sufficient bearing surfaces to permit bearing pins 24 and 25 to be positioned in openings 26 in the projecting end portions and corresponding openings 27 in the carrier element 9 and 19 in the support member 16, respectively.

For the purpose of maintaining the carrier element 9 in a normal intermediate operating position and providing a resilient connection between it and the support member 16 so that the slider shoe 12 may move relative thereto in a perpendicular plane through the trolley wire 13 both forward and backward, suitable means, such as for example, the leaf spring 28, may be connected between the support member and the carrier element on the lower side thereof. The leaf spring 28 may, for example, be rigidly attached to either the support member 16 or the carrier element 9. In this instance it is attached to the support member 16 by means of a suitable clamp 29 and presses against a surface portion 30 on the lower side of the carrier element 9.

In order to retain the carrier element 9 and the leaf spring 28 in the proper operating relation, suitable means may be provided for preventing them from separating, yet allowing relative movement therebetween. For example, as shown in Figs. 1 and 3, a retaining member 32 may be provided on the lower side of, and either integral with or separate from, the carrier element 9, positioned a sufficient distance from the surface portion 30 so as to permit the end portion of the leaf spring 28 to be positioned therebetween, and maintain it in relatively close frictional engagement therewith, so as to permit only retarded relative movement therebetween, to prevent undue vibration of the carrier element 9 with respect to the support member 16.

From the above description and the accompanying drawing, it will be apparent that I have provided in a simple and effective manner for resiliently supporting a slider shoe or trolley wheel on a trolley pole. Limited movement of the carrier element of the head on which the slider shoe is mounted relative to the trolley pole in a vertical plane in the direction of motion is provided, being limited only by the retaining force of the leaf spring, which may be made as desired. Since the leaf spring is rigidly secured at one end and maintained in frictional engagement at the other end, movements of the carrier element of the current collector head relative to the support member will be damped, thus preventing excessive vibrations of the slider shoe. Since the connector or clip pivotally connecting the carrier element and the support member is rigid and has a relatively high strength, no damage will occur thereto if the slider shoe is dewired and the connector strikes a supporting cross wire. The carrier element and slider shoe carried thereby are, nevertheless, permitted to yield with respect to the support member and trolley pole, in a perpendicular plane through the longitudinal axis of the trolley pole and clip, while remaining laterally rigid, so that shocks and vibrations are not readily transmitted from the slider shoe to the trolley pole.

Since different embodiments of the invention may be made and departures may be made from the above-described embodiment of the invention without departing from the spirit thereof, it is intended that all the matter contained in the above description and shown in the accompanying drawing shall be considered as illustrative and not in a limiting sense.

I claim as my invention:

1. The combination in a current collector having a slider shoe pivotally mounted on a carrier element, of a support member for attachment to a trolley pole, means pivotally connected to the support member and the carrier element, and a resilient support member comprising a plurality of leaf springs of different lengths rigidly secured to at least one of the said members interposed between the said members, so that at least one of the leaf springs engages the other member.

2. A current collector comprising, a slider shoe mounted for universal movement on a carrier element, a support member for attachment to a trolley pole having a socket on the lower side, an elongated connector pivotally connected to the support member and the carrier element on the upper side, and a relatively flat spring member positioned in the socket connecting the support member and the carrier element to provide a resilient connection therebetween.

3. A current collector comprising, a support member for attachment to a trolley pole, a carrier element, rigid connecting means pivotally connected to the support member and the carrier element on the upper sides thereof, and a relatively flat spring connecting the support member and the carrier element on the lower sides thereof, said spring being rigidly attached to one of said parts and frictionally engaging the other of said parts to provide highly damped, limited relative movement between the carrier element and support member.

4. A current collector comprising, a carrier element, a support member adapted to be supported by a trolley pole, an elongated rigid connector pivotally connected to the carrier element and the support member collector head on the upper sides thereof to permit relative movement therebetween about substantially horizontal axes, a leaf spring positioned beneath the connector rigidly connected to the support member and frictionally engaging the carrier element on the lower side thereof so as to provide for limited relative movement therebetween, and a conductor connected to the carrier element positioned between the connector and the leaf spring.

HERBERT O. WULFF.